United States Patent [19]

More et al.

[11] Patent Number: 4,483,393

[45] Date of Patent: Nov. 20, 1984

[54] WELL LOGGING APPARATUS AND METHOD FOR MAKING SAME

[75] Inventors: Henry S. More, Carmichael; Christopher E. Koch, Sacramento, both of Calif.

[73] Assignee: Exploration Logging, Inc., Sacramento, Calif.

[21] Appl. No.: 423,003

[22] Filed: Sep. 24, 1982

[51] Int. Cl.³ .............................................. G01V 3/20
[52] U.S. Cl. ................................................. 166/65 R
[58] Field of Search .................... 166/65 R, 66, 65 M; 174/47; 324/347, 366, 356, 369

[56] References Cited

U.S. PATENT DOCUMENTS

| | | | |
|---|---|---|---|
| 2,568,241 | 9/1951 | Martin | 175/50 X |
| 3,072,843 | 1/1963 | Clements | 324/347 |
| 3,388,325 | 6/1968 | Birdwell | 324/347 X |
| 4,286,217 | 8/1981 | Planche | 324/347 |
| 4,356,629 | 11/1982 | Jeter | 166/66 X |

Primary Examiner—Ernest R. Purser
Assistant Examiner—Timothy David Hovis
Attorney, Agent, or Firm—Christie, Parker & Hale

[57] ABSTRACT

A replaceable insulating sleeve is disposed around the lower end of a drill string used in drilling a well. The sleeve is restrained from rotating relative to the drill string, but can be released and quickly slipped off the drill string in the field to permit rapid replacement if damaged, or if alternate equipment is required. The sleeve carries sensing means for measuring a characteristic of formations penetrated by the well. Anchor means on the sensing means prevents it from rotating relative to the sleeve.

6 Claims, 20 Drawing Figures

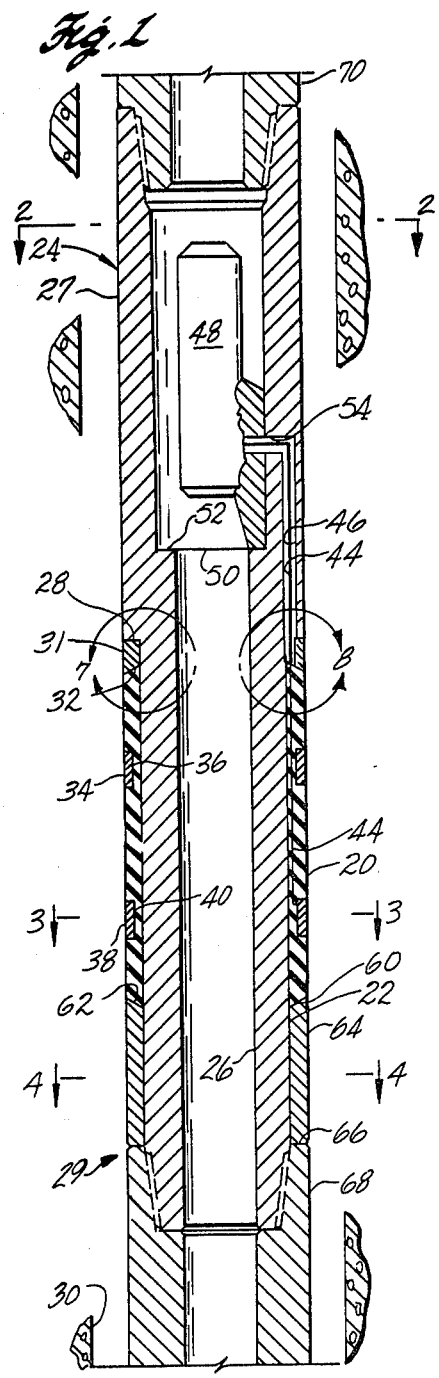

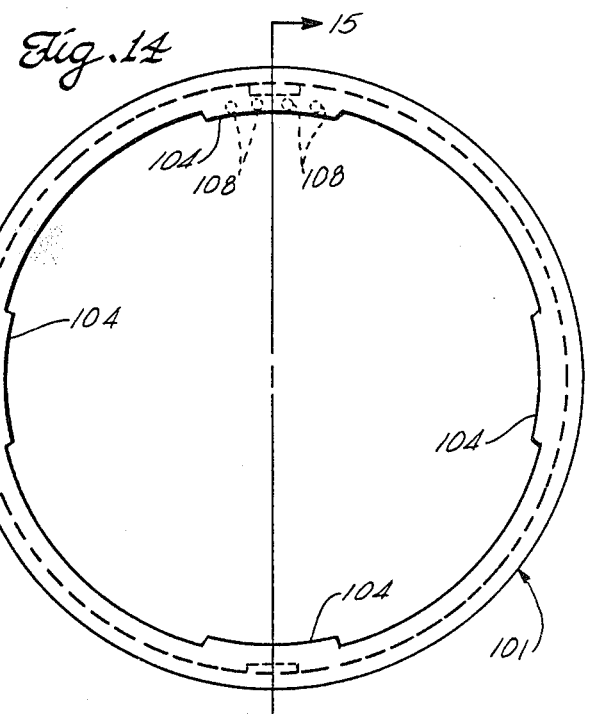
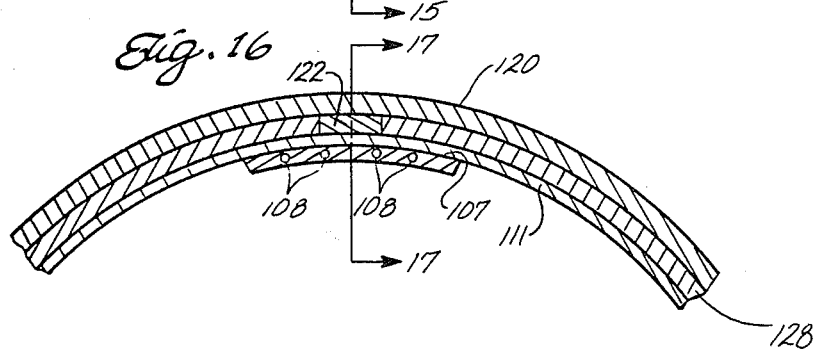
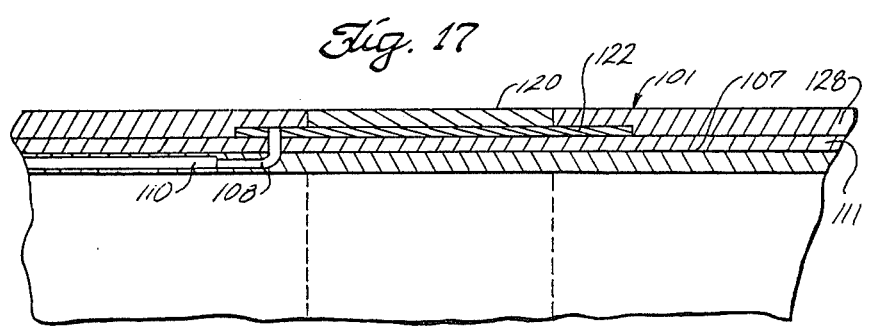

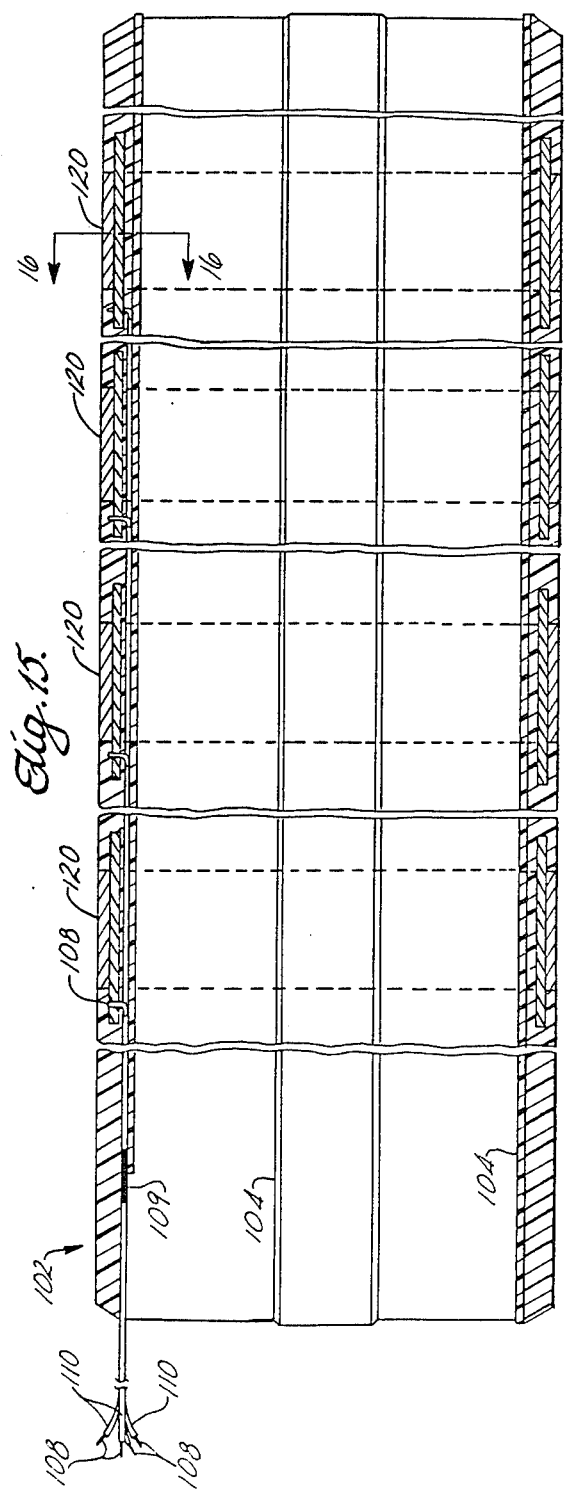

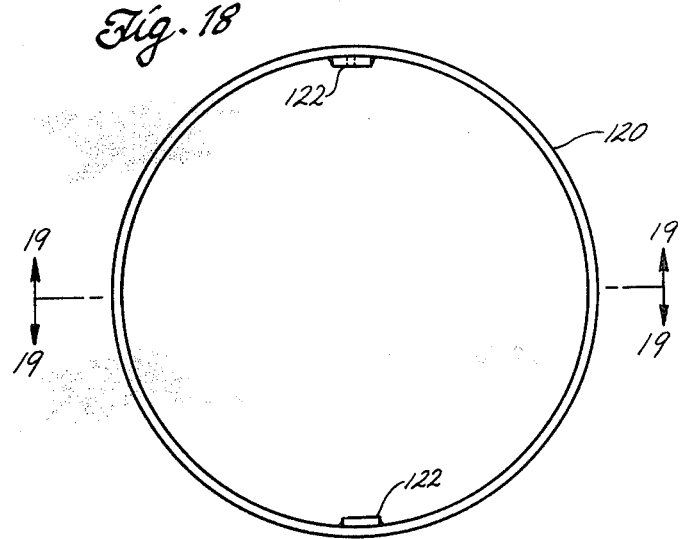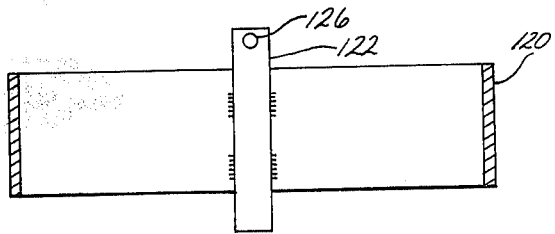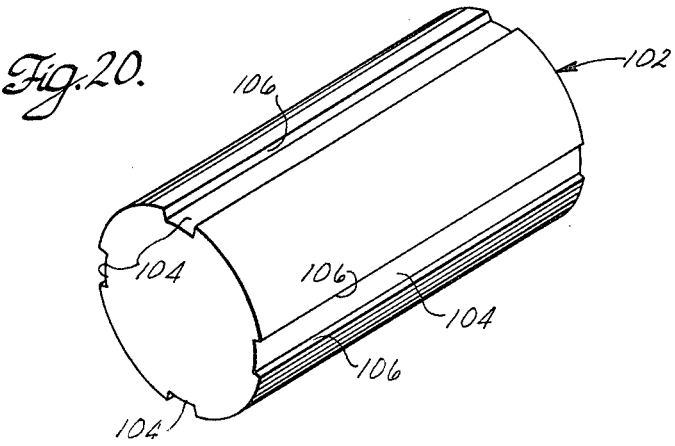

WELL LOGGING APPARATUS AND METHOD FOR MAKING SAME

BACKGROUND OF THE INVENTION

1 Field of the Invention

This invention relates to apparatus for logging wells during drilling and to methods for making such apparatus.

2 The Prior Art

Although the advantages of simultaneously drilling and logging a borehole have long been recognized, such services have developed slowly because of the lack of reliable equipment which can be quickly repaired or replaced in the field.

Many prior art patents disclose various types of electrically insulated sleeves fitted around the drill string with instrumentation just above the drill bit in an attempt to measure while drilling such variables as formation electrical resistivity, self-potential, temperature, pressure, radioactivity, directional deviation of a drill hole, and the like. Examples of such apparatus are shown in U.S. Pat. No. 2,568,241 to Martin, U.S. Pat. No. 2,930,137 to Arps, U.S. Pat. No. 3,149,683 to Clements et al, and U.S. Pat. No. 3,293,542 to Piety.

The disadvantage of the sleeves previously proposed for logging while drilling is that they often cannot withstand the severe abrasion and shock encountered downhole while drilling, and cannot be readily removed and replaced in the field, which severely limits their utility. Copending application Ser. No. 141,769, filed Apr. 21, 1980, discloses an improved sleeve for logging-while-drilling, and methods for making the sleeve. This invention provides further improvements in the sleeve and methods disclosed in copending application Ser. No. 141,769.

SUMMARY OF THE INVENTION

This invention provides an improved mounting of sensing devices on an insulating sleeve which can be easily and quickly secured around a drill string above the drill bit, and also be quickly and easily removed and replaced by another sleeve if the first sleeve should become damaged, inoperative, or inapplicable for a particular well-logging problem.

Briefly, the insulating sleeve has a longitudinal opening through it adapted to fit around a portion of a drill string. The sleeve includes an internal and longitudinally extending spline adapted to make a sliding fit in a matching longitudinal groove in the drill string. At least one annular ring of electrically conductive material is embedded in the sleeve, and a surface portion of the ring is exposed to contact fluid in the well when mounted on the drill string. An anchor strip secured to the ring and embedded in the sleeve extends longitudinally away from the ring to lock the ring in place. At least one conductor embedded in the sleeve is connected to the ring. The conductor extends out of the sleeve to permit the connector to be connected to a logging circuit in the drill string.

Preferably, the ring is electrically connected to the anchor strip, which is also of an electrically conductive material and includes a hole to receive the conductor. The portion of the anchor strip around the hole is copper-plated to facilitate connecting the conductor to the anchor strip by soldering. The ring and anchor strip are preferably of nonmagnetic metal to minimize distortion of the earth's magnetic field.

In terms method for making a logging sleeve adapted to slide on and off a drill string to be used in a well for measuring downhole characteristics in the well, the invention includes the steps of placing at least one layer of resin-coated fibers in a longitudinal groove in a mandrel. An electrical conductor is placed on the resin-coated fibers in the groove, and additional resin-coated fibers are placed on the electrical conductor to substantially fill the groove. Thereafter, resin-coated fibers are wrapped around the mandrel to cover it and the fibers in the groove. An annular ring with a longitudinally extending anchor strip is mounted on the resin-coated fibers wrapped around the mandrel, and one end of an electrical conductor is electrically connected to the ring, which is of an electrically conductive material. Additional resincoated fibers are wrapped around the mandrel and at least a portion of the anchor strip, and then the resin is cured to form a sleeve with an inner longitudinal spline adapted to make a sliding fit in a matching longitudinal groove in the drill string. Thereafter, the cured sleeve is slipped off the mandrel.

Preferably, the method includes the step of applying a resin putty to the resin-coated fibers wrapped around the mandrel and mounting the mandrel with the anchor strip in the putty. Preferably, the anchor strip is of an electrically conductive material and is electrically connected to the ring. The anchor strip includes a hole, and a portion of the anchor strip around the hole is copper-plated. The conductor is disposed in the hole and soldered to the anchor strip. Thereafter, additional resin-coated fibers are wrapped around the mandrel, the anchor strip, and the ring. The resin is cured, and a portion of it is ground away in the vicinity of the ring to expose the outer surface of the ring.

Preferably, the mandrel is wrapped with resin-coated glass fibers to a point extending longitudinally past the fibers in the groove so that the spline formed on the sleeve by the fibers in the groove terminates short of one end of the sleeve, and the conductor leaves the sleeve at that end of the spline short of the adjacent end of the sleeve. This permits the conductor to be folded back over itself to protect it during shipment and storage.

Preferably, a plurality of conductors and electrode rings are used, the electrode rings being mounted at longitudinally spaced locations on the mandrel, and a separate respective conductor is electrically connected to each of the electrode rings, preferably by means of an anchor strip, such as the type referred to above. When a plurality of conductors are used, they are preferably bound together with a protective sheath or tube which covers a span where the conductors leave the sleeve. The sheath protects the wires when they are folded over inside the sleeve for safe shipment or storage. The electrical conductors are normally wires coated with a suitable insulating plastic, such as Teflon, which tends to cold-flow when subjected to bending. Accordingly, the sheath ensures that the insulation on the wires remains intact, even though they are folded over themselves at a relatively sharp angle inside the sleeve during storage or shipment.

BRIEF DESCRIPTION OF THE DRAWINGS

FIG. 1 is a sectional elevation of the invention mounted in a drill string in a well bore;

FIG. 2 is a view taken on line 2—2 of FIG. 1;

FIG. 3 is a view taken on line 3—3 of FIG. 1;

FIG. 4 is a view taken on line 4—4 of FIG. 1;

FIG. 14 is an end elevation of the preferred sleeve made in accordance with the preferred method of this invention;

FIG. 15 is a view taken on line 15—15 of FIG. 14;

FIG. 16 is an elarged view taken on line 16—16 of FIG. 15;

FIG. 17 is a view taken on line 17—17 of FIG. 16;

FIG. 18 an end view of an electrode ring before mounting on the sleeve;

FIG. 19 a view taken on line 19—19 of FIG.18; and

FIG. 20 is a perspective view of a mandrel used to make the sleeve.

DESCRIPTION OF SPECIFIC EMBODIMENTS

Figure 5:
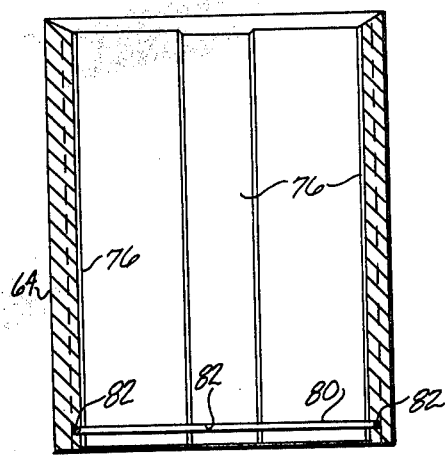
FIG. 5 is an enlarged sectional elevation taken on line 5—5 of FIG. 4, and in which the housing is not shown.

Referring to FIG. 1, an elongated, cylindrical, hollow sleeve 20 makes a close slip-fit over a lower section 22 of an elongated, generally cylindrical housing 24 having a central longitudinal bore 26 extending through it. The housing includes upper section 27 of larger outside diameter than the lower section 22, so that an annular, downwardly facing (as viewed in FIG. 1) shoulder 28 is formed where the larger section 27 steps down to the smaller diameter of lower section 22. The housing is part of a drill string 29 disposed in a well bore 30.

An annular wear ring 31 makes a close slip-fit around the smaller diameter section 22 of the housing so that the upper surface of the wear ring bears against shoulder 28. The lower surface 32 of the wear ring slopes downwardly and outwardly to rest on a matching surface at the upper end of the sleeve.

An upper electrode ring 34 is disposed in an upper circumferential and outwardly opening groove 36 in the outer surface of the sleeve. A lower annular electrode 38 is disposed in a lower circumferential and outwardly opening groove 40 in the outer surface of the sleeve.

Figure 11:
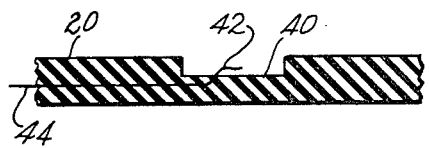
FIG. 11 is a schematic sectional elevation of a portion of the sleeve before the application of electrode material.
Figure 12:
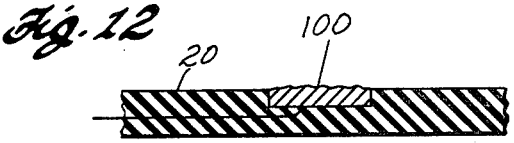
FIG. 12 is a view similar to FIG. 11 showing electrode material applied to the sleeve.
Figure 13:
FIG. 13 is a view similar to FIGS. 11 and 12 showing the electrode in a finished condition.

The upper and lower electrodes are connected by separate electrical conductors 42 (one such conductor is shown in FIGS. 11-13) in a cable 44, which extends up through the insulated sleeve and a cable tunnel 46 formed through the wear ring and the wall of the housing.

The upper end of the cable is connected to a power and instrument package 48, which includes an electrical power source (not shown) and appropriate equipment (not shown) for generating, measuring, and recording signals developed in response to various physical characteristics of the adjacent formation in the well bore. The power and instrument package is secured in the center of the central bore 26 of the housing by three equally spaced and radially extending spiders 50 secured at their inner ends to the power and instrument package. The outer ends of the spiders bear against the interior surface of the bore through the housing. The lower edges of the spiders rest on an annular and upwardly facing internal shoulder 52 formed within the bore 26 in the housing. As shown in FIGS. 1 and 2, the cable tunnel includes a horizontal section 54, which extends from the power and instrument package through one of the spiders to join the upper end of the vertical portion of the cable tunnel in the wall of the housing.

The lower end of the insulated sleeve has a downwardly and inwardly extending annular surface, which rests on a matching surface 62 on the upper end of a torque tube 64, which makes a close slip-fit around the lower portion of the housing. The lower end of the torque tube rests on an upwardly facing annular shoulder 66 at the upper end of a drill collar section 68, into which the lower end of the housing is threaded. The upper end of the housing is threaded onto the lower end of a section of drill collar 70 in the drill string.

As shown in FIG. 3, the insulating sleeve includes four equally spaced, inwardly projecting, and longitudinally extending splines 72, which each fit into a respective matching outwardly opening and longitudinally extending groove 74 in the outer surface of the housing. The splines on the insulated sleeve extend for the full length of the sleeve. The grooves in the exterior surface of the housing extend from about the midpoint of the wear ring to the lower end of the torque tube, which has four equally spaced, inwardly projecting splines 76 (FIG. 4) which extend longitudinally for the length of the torque tube and fit into the housing grooves.

In effect, the splines 72 on the sleeve form a separate longitudinally extending groove 77 between adjacent splines, and the grooves 74 in the housing form a separate longitudinally extending spline 78 between adjacent grooves.

The bottom surfaces of the grooves and the top surfaces of the splines of the sleeve and the housing taper inwardly away from the shoulder to facilitate assembly and disassembly of the sleeve on the housing. The amount of taper can vary over a wide range, but we have found that a relatively slight taper, say, about $\frac{1}{8}$" in 13 feet, is adequate to provide an easy, but close slip-fit of the sleeve on the housing.

The splines 76 on the torque tube form a separate longitudinally extending groove 79 between adjacent splines. The grooves and splines of the sleeve and torque tube make a close slip-fit with the grooves and splines of the housing so the torque tube is firmly supported against rotation relative to the housing, but is easily moved longitudinally when necessary.

Figure 6:
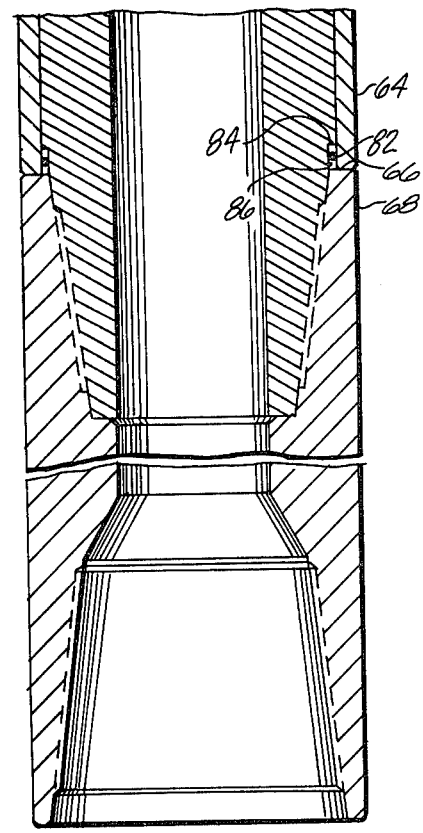
FIG. 6 is an enlarged sectional elevation of the lower portion of FIG. 1.

Referring to FIG. 5, which is a view taken on line 5—5 of FIG. 4 (with the housing not shown), a wire retaining ring 80 is disposed in four inwardly opening, circumferential grooves 82 formed in the lower ends of the torque tube splines 76, so the wire is secured under an outwardly extending and downwardly facing shoulder 84 (FIG. 6), where the o.d. of the housing is reduced for a short, vertical section 86 adjacent the upper end of the lower drill collar section 68. The retaining ring 80 prevents the torque tube from sliding upwardly along the housing if the insulated sleeve should be worn away during drilling operations.

Figure 7:
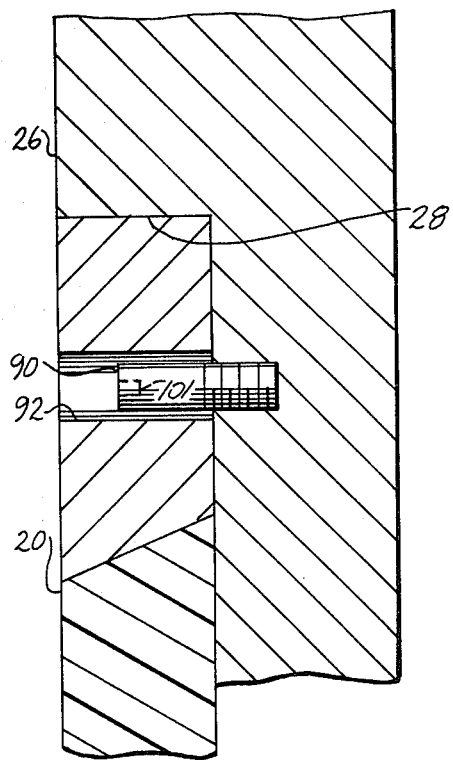
FIG. 7 is an enlarged view taken in the area of 7—7 of FIG. 1.

Referring to FIG. 7, the wear ring is prevented from sliding downwardly (if the insulated sleeve should be worn away during drilling operations) by a bolt 90 threaded into the housing wall to project outwardly into the inner end of a bore 92 extending radially through the wear ring wall. More than one such bolt can be used, if desired. Three inwardly and longitudinally extending splines 93 (FIGS. 9 and 10) on the inner surface of the lower half of the wear ring each fit into a respective groove 74 in the outer surface of the housing to prevent the wear ring from rotating on the housing, and yet leave the wear ring free to slide longitudinally when the bolt 90 is removed.

Figure 8:
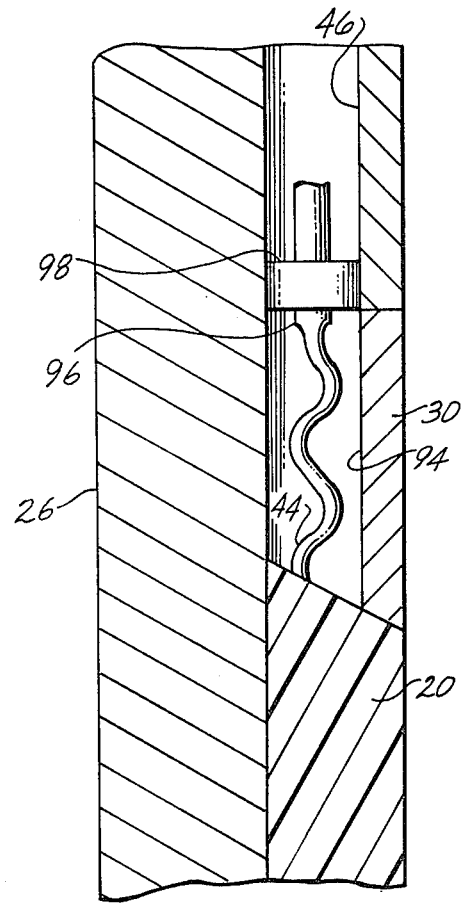
FIG. 8 is an enlarged view taken in the area of 8—8 of FIG. 1.
Figure 9:
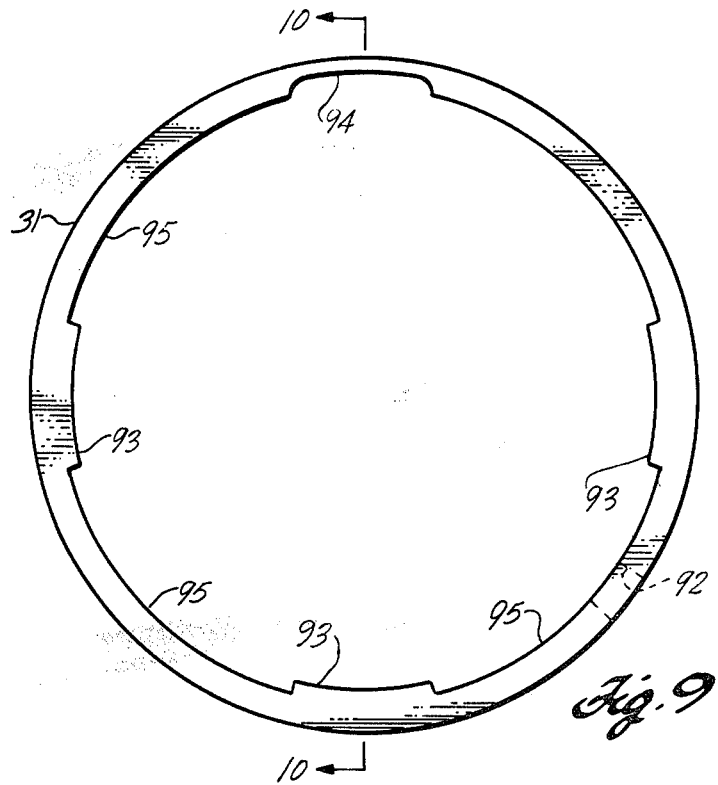
FIG. 9 is an end view of the wear ring.
Figure 10:
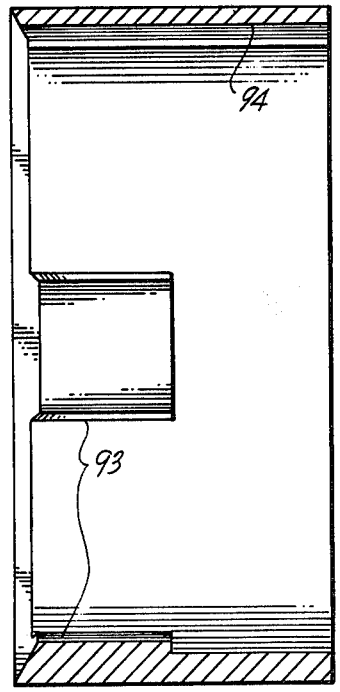
FIG. 10 is a view taken on line 10—10 of FIG. 9.

As shown best in FIG. 8, the upper end of the electrical cable 44 extends from the upper end of the insulating sleeve into a longitudinally extending slot 94 (FIGS. 9 and 10) in the interior surface of the wear ring. As shown in FIG. 9, the slot 94 is spaced 90° from two of the wear ring splines 93, which are each spaced 90° from the third spline. Thus, the three wear ring splines each form a separate respective groove 95 between adjacent splines, the groove which includes slot 94 being twice as wide as the other two. Accordingly, the grooves and splines of the wear ring make a close slip-fit with all four of the splines on the housing, but with only three of the grooves in the housing because of wear ring slot 94. This is adequate support to restrain the wear ring from rotating relative to the hous- ing.

The upper end of the cable carries a connector plug 96, (FIG. 8), which releasably fits into a socket 98 sealed in the lower end of the vertical portion of the cable tunnel 46 in the wall of the housing to prevent incursion of drilling fluid into the power and instrument package. The plug 96 is provided with suitable sealing means (not shown), which may be of conventional construction, to prevent incursion of high-pressure fluids from the well bore into the electrical connections made by the plug with the socket.

The material which forms the insulated sleeve must withstand high temperatures and shock. It must also have reasonably good wear resistance to the abrasive conditions encountered during the drilling of most wells, and it must have high electrical resistivity to avoid unacceptable leakage between the drill string and electrodes or other sensing devices on the sleeve. These requirements are met by forming the insulating sleeve from glass fibers and epoxy resin, which includes particles of abrasion-resistant material, such as aluminum oxide sold under the trademark "Carborundum". U.S. Pat. No. 3,072,843 to Clements et al describes the use of such materials to form an electrode sleeve on a drill pipe.

We have prepared suitable insulating sleeves by wrapping glass fibers coated with epoxy resin and Carborundum particles around a mandrel (not shown) which matches the surfaces of the portion of the housing around which the insulated sleeve is to fit. During the wrapping operation, the appropriate electrical conductors are embedded in the wall of the insulating sleeve as it is formed. The top and bottom surfaces of the splines and grooves of the mandrel taper toward one end to match that of the housing. Accordingly, after the resin has cured, the formed sleeve can be easily slipped off the mandrel, and the internal surfaces of the sleeve are tapered to match those on the housing.

The principal steps in making an electrode sleeve assembly, say, useful for electric well logging, are shown in FIGS. 11—13. Outwardly opening, circumferential grooves 40 (only one groove is shown in FIGS. 11—13) are formed in the outer surface of the sleeve to reach the end of one of the conductors 42 embedded in the sleeve wall during the production of the sleeve. The end of the conductor is raised into the groove and stripped of insulation to expose bare metal.

As shown in FIG. 12, a metallic conductor material 100 is deposited in the prepared groove to invest the exposed end of the conductor. The deposited metal may be sprayed into place by the well-known Metco process. It may also be electrodeposited, accumulated by vapor deposition, or any combination of such processes. Spray deposition is presently preferred. As shown in FIG. 13, the deposited metal is smoothed so that its outer surface is flush with the outer surface of the sleeve, leaving an annular electrode 38.

In using the replaceable sleeve of this invention, it is assembled as shown in FIG. 1, so that it is firmly supported on the housing and clamped between the wear ring at its upper end and the torque tube at its lower end. The torque tube is made of steel of sufficient strength to accept the wear and stress imposed by conventional tongs (not shown) when the housing is threaded into, or out of, a drill collar. The annular shoulder 66 on the drill collar holds the torque tube in a snug fit against the sleeve, which is thereby placed in slight, but firm, compression for the drilling operation. The torque tube accepts all of the mechanical wear and tear in connecting or disconnecting the housing in the drill string.

Although the insulated sleeve can vary in length for different uses, for most well logging operations, it will be between about 2 and about 15 feet long. If it is relatively short, say, only a foot or two, the torque tube may be omitted, letting the lower end of the electrode sleeve bear directly against the shoulder 66 on the drill collar section 68. Under these circumstances, the tongs, normally used to make up or break apart drill string, would have to be shifted upwardly from their normal position to engage the housing above the insulating sleeve. If the sleeve is more than a few feet long, it normally would not be feasible to raise the tongs sufficiently high to avoid contact with the sleeve. Accordingly, the torque tube is almost always required for practical operations.

Although the insulating sleeve in the specific embodiment described above is built to facilitate measuring the electrical resistivity of formations traversed by the well bore, the sleeve can be provided with other sensing devices for measuring other characteristics of the formations. For example, piezoelectric crystals can be embedded in the sleeve to measure acoustical properties, or other sensors can be used to measure pressure, temperature, or borehole deviation during the drilling.

An important advantage of this invention is that the insulating sleeve can be quickly and easily assembled on, or removed from, the primary housing. This is essential in most drilling operations where delays in handling equipment at a drilling rig are expensive and sometimes dangerous.

If the insulated sleeve is damaged or worn away during drilling operations, the wear ring protects the annular shoulder 28 on the housing from damage. The retaining ring in the lower end of the torque tube prevents the tube from sliding up and down the housing, avoiding possible damage to the housing or the wear ring.

In the course of prolonged use, the wear ring may eventually be so worn or damaged that it no longer protects the shoulder or holds the insulated sleeve in the desired position on the housing. The wear ring is then easily removed and replaced by a new one.

If desired, a second wear ring of appropriate size and shape can be disposed between the torque tube and the lower end of the insulated sleeve to prevent damage to the upper end of the torque tube when the insulated sleeve is worn away.

The insulated sleeve is easily replaced by simply slipping it off the lower end of the housing after the housing is removed from the drill collar section 68, and the torque tube is slipped off the lower end of the housing. The electrical plug 96 (FIG. 8) is disconnected by removing the bolt 90 (FIG. 7) from the bore 92 in the wear ring wall so the wear ring and insulating sleeve can be lowered a few inches to provide access to the plug 96, which is then removed. A similar plug (not shown) on a replacement sleeve (not shown) is connected to the socket 98 and sealed thereto by appropriate means (not shown). The wear ring is then raised back to its position against shoulder 28 on the primary housing and locked in place by inserting the bolt 90, which has an internal hex socket 101 to facilitate screwing the bolt into and out of the housing wall. The torque tube is slipped over the lower end of the housing to the position shown in FIG. 1. The tongs are applied to the torque tube, and the lower end of the housing is threaded into the upper end of the drill collar section 68 until the torque tube, insulated sleeve, and wear ring are snugly fitted together as shown in FIG. 1.

With the apparatus assembled as shown in FIG. 1, it can be used to log the electrical resistivity of formations traversed as the well is drilled. The logging information can be either recorded with equipment (not shown) in the power and instrument package, or it can be transmitted to the surface during drilling by generating coded pressure pulses in the drilling fluid, such as described in U.S. Pat. No. 3,964,556 to Gearhart et al or U.S. Pat. No. 4,078,620 to Westlake et al.

FIGS. 14-19 show the presently preferred embodiment of a sleeve 101 and method for making it. A sleeve of the type shown in FIGS. 14 and 15 is made by forming it on an elongated cylindrical mandrel 102 having four longitudinal splines or grooves 104 equally spaced around its circumference. Each groove has a pair of sidewalls 106 which slope outwardly away from each other. The mandrel tapers slightly, say, from left to right (as viewed in FIG. 20) from a larger diameter to a smaller diameter to form a sleeve with an internal taper, as described above.

A coating of mold-release agent (not shown) is applied to the mandrel, and then a coating of epoxy resin (not shown) is applied to the bottom and sidewalls of each groove, which is then filled to a level 107 with seven strips (not individually shown) cut from 9-ounce fiberglass sheets and coated with epoxy resin. One of the grooves in the mandrel, say, the top groove, as viewed in FIG. 20, serves as a wireway for four copper wires 108, each of which is covered by a conventional insulation 110, such as Teflon plastic. The wires are sandwiched between the third and fourth strips (not shown) of fiberglass sheets as they are placed in the groove which serves as a wireway. The left (as viewed in FIG. 15) end of the wireway groove is not filled with fiberglass for a relatively short distance, say, about 2". To facilitate this step, the left end of the wireway groove may be covered with a strip of masking tape, or the like. Thus, after the sleeve 101 is completed, as shown in FIGS. 14 and 15, the upper or wireway spline of the sleeve terminates 2" short of the left (as viewed in FIG. 15) end of the sleeve.

During the manufacturing of the sleeve, the wires are covered with a section 109 of high-temperature heat-shrink tubing about ½" long to clamp them together and provide protection where the wires emerge from the sleeve wireway spline. After the sleeve is completed, the left (as viewed in FIG. 15) ends of the wires are connected to a suitable plug (not shown) as described with respect to FIG. 8 above. During shipping or storage, the free ends of the wires and the plug are folded back inside the sleeve to protect them from inadvertent damage. The section of heat-shrink tubing around the wires prevents the plastic insulation on them from cold-flowing, which might permit the wires to shortcircuit.

As shown best in FIG. 15, the right end of the wires terminate at different distances within the upper spline of the sleeve. For example, using a sleeve about 160" long, the shortest wire terminates about 78" from the left end of the sleeve, the next about 94", the next about 113", and the fourth about 121" from the left end. The right (as viewed in FIG. 15) end of each wire is pushed up through each overlying strip of fiberglass placed on them in the wireway groove of the mandrel.

After the mandrel grooves are filled with resin-coated fiberglass strips to level 107 (FIGS. 16 and 17), the mandrel is helically wrapped with a 6-inch wide strip 111 (FIG. 16) of 6-ounce fiberglass for its full length, with the adjacent edges of the 6-ounce fiberglass overlapping by about 3". The right end of each conductor is pushed up through the 6-ounce fiberglass during the wrapping opera- tion.

Four separate electrode rings 120 (FIGS. 15, 16, and 17) are disposed around the mandrel adjacent the right (as viewed in FIG. 15) end of a respective conductor. Each electrode ring includes a pair of longitudinally extending rectangular anchoring strips 122 spot-welded to the interior of each ring at diametrically opposed locations. The electrode rings can be of any suitable size. For a typical electrical logging operation, using a sleeve about 6" in diameter, each ring would have an outside diameter of about 6.25" and would be about 1.6" long. Each anchoring strip would be about 2.6" long, about 0.5" wide, and about 0.13" thick. As shown best in FIG. 16, the rings are positioned so that a respective anchoring strip on each of them is centered over the wireway groove in the mandrel.

The left (as viewed in FIG. 15) end of each anchor strip disposed over the wireway groove includes a radially extending bore 126 (FIGS. 17, 18, and 19) through it. The end of the anchor strip adjacent the bore, including the surface in the bore, is copper-plated to a thickness between 0.003" and 0.005" thick. About 0.14" of insulation is stripped from the right (as viewed in FIG. 15) end of each electrical conductor, and each stripped end of each conductor is disposed in a respective bore 126 in the adjacent anchor strip. The copper conductor is then soldered to the copper-plated area of the anchor strip to provide good electrical contact between each copper wire and the respective anchor strip and electrode ring to which it is attached. Preferably, the electrode ring and the anchor strip are made of a nonmagnetic stainless steel. For example, Inconel Alloy 600, cold-rolled stainless steel sheet, is a good material for this purpose.

Before the electrode rings are placed in the positions shown in FIG. 15, each respective area under a ring is coated or built up with epoxy putty, which may be epoxy resin mixed with shredded glass fibers. Each electrode ring is then installed in the position shown in FIG. 15 with the anchor strips and adjacent inner surfaces of the rings embedded in the epoxy putty. Thereafter, fiberglass roving (not shown), coated with conventional epoxy resin and a high-temperature curing, is wound around the 6-inch-wide 6-ounce fiberglass strip 111 on the mandrel and around the anchor strips and electrode rings to build up a wall 128 up to an outside diameter slightly greater than that of the electrode rings. In other words, the outer surfaces of the electrode rings are covered with one or two layers (not shown) of fiberglass roving saturated with epoxy resin. Preferably, this winding operation is first done with a resin of one color to the inner edge of the electrode rings. Thereafter, the lining is completed using resin of a different color. Preferably, aluminum oxide particles are included in at least the outer surface of the resin-coated fiberglass rovings during the winding operation to provide improved abrasion resistance as described above. In fact, if the aluminum oxide is of a different color from the resin, it will provide the desired color change as wear takes place on the outer surface of the sleeve. Thus, as the outer surface of the sleeve is worn away in service, a change of color will indicate when the wear has approached or exceeded acceptable limits.

During the manufacture of the sleeve, care is taken to ensure a "wet bond" between adjacent layers of resin-coated fibers as they are placed. This will ensure good bonding and provide a virtually monolithic final structure.

Preferably, the fiberglass rovings are wound in helical patterns back and forth along the mandrel to build up a wall of required thickness.

After the mandrel is completely wrapped as described above, it is heated sufficiently to cure the epoxy resin and form a tough and rigid sleeve, when can then be slipped off the smaller end of the mandrel.

The cured resin and fibers overlying the electrode rings is removed by surface grinding to expose the outer surface of each ring so they can contact fluid in the well bore when the sleeve is mounted on a drill string for logging-while-drilling.

The advantage of a sleeve constructed as described with respect to FIGS. 14–20 is that the longitudinal grooves in the mandrel are fully and uniformly filled with resin and fibers, which are securely bonded to the material wrapped in helical patterns around the rest of the mandrel. This provides good hoop strength and a surface with longwearing characteristics. The longitudinally extending anchor strips on the electrode rings help prevent the rings from being moved around the longitudinal axis of the sleeve and relative to the rest of the sleeve when the sleeve is rotated with the drill string. Moreover, if the sleeves are subjected to slight deformation or shifting, the connection of the electrical wires to the anchor strips, rather than directly to the rings, helps reduce the possibility of breaking electrical contact between the wires and their respective electrode rings. With the arrangement shown in FIG. 13, the electrode ring 38 is not as firmly anchored against rotational movement relative to the sleeve, and a relatively small amount of such movement could break good electrical contact between the conductor and the ring.

From the foregoing description, it will be apparent that this invention provides an improved mounting for sensing devices on an insulated sleeve which can be quickly and snugly fitted around a portion of the drill string so the sleeve is not rotatable relative to the drill string, and so the sleeve can be quickly slipped off the drill string, when required.

We claim:

1. Well logging apparatus comprising:
   an insulating sleeve having a longitudinal opening through it and adapted to fit around a portion of a drill string;
   the sleeve including an internal and longitudinally extending spline adapted to make a sliding fit in a matching longitudinal groove in the drill string;
   at least one annular ring of electrically conductive material embedded in the sleeve, a surface portion of the ring being exposed to contact fluid in the well when mounted on the drill string;
   an anchor strip secured to the ring and embedded in the sleeve, the strip having a greater longitudinal than the ring; and
   at least one conductor embedded in the sleeve and connected to the ring, the conductor extending out of the sleeve to permit the conductor to be connected to a logging circuit in the drill string.

2. Apparatus according to claim 1 in which the electrical conductor is connected to the anchor strip at a point longitudinally spaced from the ring, the strip and ring being of electrically conductive material.

3. Apparatus according to claim 2 in which the anchor strip includes a hole in it, the conductor being disposed in the hole and soldered to the strip.

4. Apparatus according to claim 2 or 3 in which a portion of the anchor strip is copper-plated, and the conductor is soldered to the copper-plated surface of the strip.

5. Apparatus according to claim 1 or 2 in which a second longitudinally extending anchor strip is secured to the ring at a circumferentially spaced location from the first strip.

6. Apparatus according to claim 5 in which the strip or strips are welded to the ring.

* * * * *

UNITED STATES PATENT AND TRADEMARK OFFICE
CERTIFICATE OF CORRECTION

PATENT NO. : 4,483,393

DATED : November 20, 1984

INVENTOR(S) : HENRY S. MORE ET AL

It is certified that error appears in the above-identified patent and that said Letters Patent are hereby corrected as shown below:

```
Col. 2, line 18, "resincoated" should read -- resin-coated --
Col. 3, line 24, "elarged" should read -- enlarged --
Col. 5, line 26, "hous- ing" should read -- housing --
Col. 8, line 32, "opera- tion" should read -- operation --
Col. 9, line 6, after "curing" insert -- agent --

Col. 10, line 31 (Claim 1, line 14), before "than" insert
                 -- extent --
```

Signed and Sealed this

Fifth Day of November 1985

[SEAL]

Attest:

Attesting Officer

DONALD J. QUIGG

Commissioner of Patents and Trademarks